United States Patent [19]

Wood

[11] Patent Number: 4,610,468
[45] Date of Patent: Sep. 9, 1986

[54] QUICK CONNECT/DISCONNECT COUPLING

[75] Inventor: Richard D. Wood, Columbia City, Ind.

[73] Assignee: United Technologies Automotive, Inc., Dearborn, Mich.

[21] Appl. No.: 640,740

[22] Filed: Aug. 14, 1984

[51] Int. Cl.⁴ ............................................. F16L 35/00
[52] U.S. Cl. ..................... 285/81; 285/307; 285/308; 285/315; 285/319; 285/921
[58] Field of Search ............... 285/6, 81, 82, 89, 307, 285/308, DIG. 22, 315, 316, 334.5, 319, 322

[56] References Cited

U.S. PATENT DOCUMENTS

| 2,441,344 | 5/1948 | Bosworth . | |
|---|---|---|---|
| 3,136,366 | 6/1964 | Brown et al. | 285/308 X |
| 3,193,309 | 7/1965 | Morris . | |
| 3,222,088 | 12/1965 | Haeber | 285/316 X |
| 3,359,015 | 12/1967 | Zahuranec | 285/89 |
| 3,439,944 | 4/1969 | Leutenegger . | |
| 3,447,819 | 6/1969 | Borsum et al. . | |
| 3,711,125 | 1/1973 | Dehar . | |
| 3,731,955 | 5/1973 | Borsum et al. | 285/307 X |
| 3,743,326 | 7/1973 | Courtot . | |
| 3,773,360 | 11/1973 | Timbers | 285/307 |
| 3,826,523 | 7/1974 | Eschbaugh . | |
| 3,847,421 | 11/1974 | Eschbaugh et al. . | |
| 3,997,196 | 12/1976 | Karchu et al. . | |
| 4,005,883 | 2/1977 | Guest et al. | 285/322 |
| 4,021,062 | 5/1977 | Mariaulle . | |
| 4,074,912 | 2/1978 | Bilderbeck et al. | 285/319 X |
| 4,105,226 | 8/1978 | Frey et al. . | |
| 4,123,090 | 10/1978 | Kotsakis . | |
| 4,135,745 | 1/1979 | Dehar . | |
| 4,240,651 | 12/1980 | Mariaulle . | |
| 4,440,424 | 4/1984 | Mode . | |

FOREIGN PATENT DOCUMENTS 1455850  10/1966  France ............................. 285/316

Primary Examiner—Dave W. Arola
Attorney, Agent, or Firm—Robert P. Hayter

[57] ABSTRACT

A quick connect/quick disconnect coupling utilizes a retainer mounted between expanded ring portions of a tube. A sleeve is mounted over the retainer such that projecting leg portions from the retainer extend outwardly through openings in the sleeve. Upon assembly into a socket these outwardly projecting leg members engage a socket contact face to secure the coupling in the assembled position. To effect removal of the coupling the tube is displaced within the socket such that the retainer is displaced relative to the sleeve. As the retainer is displaced relative to the sleeve a compaction annulus portion of the sleeve acts to compress the projecting legs such that the tube with the attached retainer and sleeve may be removed from the socket to effect disconnection of the coupling.

7 Claims, 9 Drawing Figures

QUICK CONNECT/DISCONNECT COUPLING

BACKGROUND OF THE INVENTION

This invention relates to a coupling for joining two fluid conducting devices, and particularly to a coupling capable of being easily connected and disconnected manually. In many applications it is desirable to provide manual means for joining a fluid carrying tube to another device such as a coupling, pump housing or valve body. It is desirable to provide an interlocking means for engaging the tube to the coupled device such that a secure leak-tight arrangement is provided to secure both components together. It is also desirable to provide a locking device to prevent inadvertent uncoupling of the two components. In addition it is desirable to provide manual means for disconnecting the two devices to allow for separation of the tube from the coupled element such that the components may be separated.

SUMMARY OF THE INVENTION

It is an object of this invention to provide a plug and socket coupling capable of both being quickly connected and quickly disconnected.

It is a further object of the present invention to provide a coupling capable of being connected and disconnected without the use of tools.

It is a still further object of the present invention to provide a coupling which may be assembled and disassembled in a restricted space and without requiring clearance space for the use of tools to effect either assembly or disassembly of the coupling.

It is a yet further object of the present invention to provide a coupling having a series of components which may be assembled to each other with ease and without damage to any of the other components and without requiring any tools.

It is another object of the present invention to provide a plug assembly and socket forming a coupling which may be formed as an integral part of other components. The plug assembly may be formed including as an integral part thereof a tube or conduit and the socket may be a separate element or may be an integral portion of another machined element, such as a valve, transmission body, pump or other fluid carrying device.

Another object of the present invention is to provide a simple, economical and reliable quick connect/disconnect coupling.

Other objects will be apparent from the description to follow and the appended claims. These and other objects of the present invention are achieved according to a preferred embodiment by providing a plug and socket coupling for use with fluid carrying members. The coupling includes a socket defining a central cavity including a fluid flow outlet and a portion for receiving the plug, said portion including a radially extending contact face; and a plug assembly including a tube, a retainer with projecting flexible legs mounted about the tube, and a sleeve mounted about the retainer sized to be able to slide over and compress the retainer legs, said plug assembly being sized to fit within the socket central cavity such that the projecting retainer legs engage the contact face to prevent removal of the plug assembly from the socket and such that the retainer may be displaced relative to the sleeve to cause the sleeve to compress the retainer legs to allow removal of the plug assembly from the socket.

The present invention further includes a quick connect/disconnect coupling having a tube with spaced expanded ring portions, a retainer having at least one flexible outwardly projecting leg and being sized to fit about the tube between the ring portions, said retainer including a retainer body having an exterior diameter and said leg being capable of being compressed to fit within said body diameter, a sleeve sized to be mounted over the retainer having a compaction annulus with an internal diameter slightly larger than the external diameter of the retainer, a body portion connected to the annulus and defining an opening through which the retainer leg may extend and a contact portion connected to the body portion at the opposite end from the annulus, said sleeve being mounted in the coupled position with the retainer leg extending through the opening and having a compact position where the compaction annulus engages the retainer leg to displace the leg inwardly to fit within a cylinder having the diameter of the retainer body, and a socket including an abutment face and defining a center cavity including an outlet and a leg retaining annulus each that the tube, retainer, sleeve combination may be inserted into the center cavity until the contact portion of the sleeve engages the abutment face with the retainer leg extending outwardly to engage the leg receiving annulus to secure the tube in the socket and wherein the tube may be removed from the socket by forcing the tube further into the socket such that the retainer is displaced by the tube while the sleeve is secured against the abutment face creating relative sliding motion such that the compaction annulus of the sleeve compresses the leg of the retainer and the entire tube, retainer, and the sleeve assembly may then be removed from the socket.

DESCRIPTION OF THE PREFERRED EMBODIMENT

The invention herein will be described with reference to a quick connect/quick disconnect coupling designed for use with an automotive heater system. It is to be understood that this invention has like applicability to other types of fluid carrying conduits and to junctions made where the tube portion is either the end of a conduit or stand alone connecting piece and the socket portion is either a portion of another fluid associated component such as a pump, gear box, valve body or a stand alone component.

Figure 1:
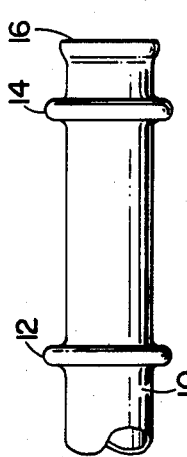
FIG. 1 is a perspective view of an end of a tube.

Referring first to FIG. 1, there may be seen a view of the end of a tube 10. Tube 10 has expanded ring portion 12 spaced from expanded ring portion 14 and includes flared end 16. The expanded portions are formed by displacing the material of the tube outwardly to form radially outwardly extending ring portions.

Figure 2:
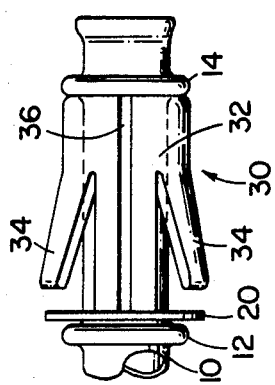
FIG. 2 is a perspective view of a retainer.
Figure 8:
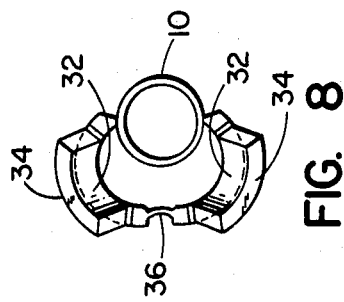
FIG. 8 is an end view of the retainer being mounted about the tube.

FIG. 2 shows retainer 30 mounted about tube 10 between expanded ring portions 12 and 14. Retainer 30 includes outwardly projecting legs 34 flexibly secured to retainer body 32. Additionally as may be seen in both FIG. 2 and FIG. 8, retainer 30 is formed with two semi-cylindrical sections 32 from which legs 34 project, said sections being joined by binding portion 36 on one edge. The other end of the two sections are left open such that the retainer may be spread and passed over tube 10 to be secured thereto.

Figure 3:
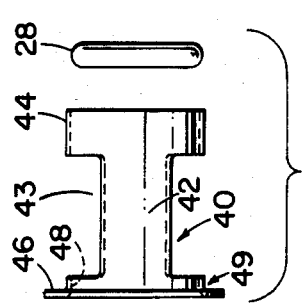
FIG. 3 is a perspective view of a sleeve.

Sleeve 40 as may be seen in FIG. 3 is a generally cylindrical member having a cylindrical compaction annulus 44 at one end. The internal diameter of the compaction annulus 44 is slightly larger than the exterior diameter of retainer 30. Body 42 of sleeve 40 extends on opposite sides and defines therebetween openings 43 through which legs 34 may extend when the sleeve is assembled to the retainer. Contact portion 49 of sleeve 40 includes a radially outward extending surface having contact face 46 and a cylindrical inner surface 48. The inner surface 48 is sufficiently large that expanded ring portion 12 may pass therethrough. O-ring 28 is shown positioned adjacent sleeve 40 such that it may additionally be mounted to the flared end 16 of tube 10.

Figure 4:
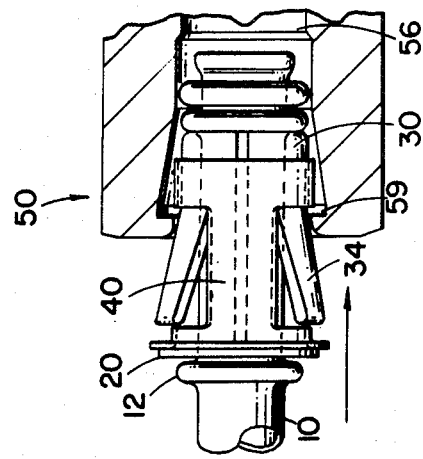
FIG. 4 is a view partially in section of the plug assembly being inserted into a socket.

In FIG. 4 it may be seen that the retainer, sleeve and O-ring have been mounted to tube 10. Additionally a sleeve retaining ring 20 has been mounted between expanded ring portion 12 and the end of retainer 30. This sleeve retaining ring is sized to prevent expanded ring portion 12 from slidably passing therethrough and when assembled engages contact portion 49 of sleeve 40.

As may be further seen in FIG. 4, socket 50 defines a central cavity 56 into which a plug assembly comprised of the tube, retainer and sleeve may be inserted. The center cavity 56 further defines a leg receiving annulus 59 extending radially outward from the centerline of the socket and providing a surface with which the legs 34 may mate to prevent the plug assembly from being removed from the socket. Sleeve 40 is shown mounted about retainer 30 with legs 34 extending through the openings therebetween.

Figure 5:
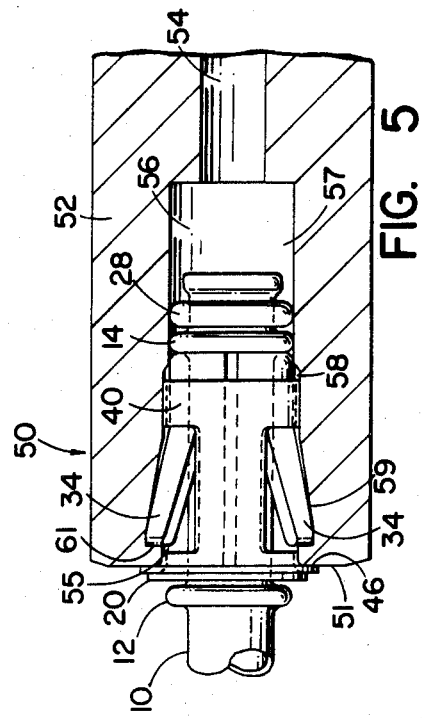
FIG. 5 is a view partially in section of the plug assembly secured within the socket.

FIG. 5 is a view of the coupling in the fully assembled position. In this position socket 50 is shown in section defining a center cavity 56 having outlet 54 for the fluid flowing therethrough. The side walls of the socket are designated by the numeral 52. The center cavity 56 defines a cavity seal portion 57 wherein O-ring 28 may engage the interior surface of the cavity to effect a seal therebetween to prevent the fluid flowing through the tube from exiting the cavity around the plug assembly. The center cavity additionally includes cavity sleeve portion 58 of slightly larger internal diameter than cavity seal portion 57 and being that portion wherein sleeve 40 including the annulus portion of sleeve 40 is maintained. The center cavity additionally includes leg receiving annulus 59 being a radially outward extension of the cavity and defining a socket face 61. Upon assembly legs 34 of the retainer spring outwardly into the leg receiving annulus with the end of leg 34 abutting socket contact face 61 such that the tube may not be pulled to the left from the socket body. Additionally shown in FIG. 5 is tube 10, expanded ring portions 12 and 14 and O-ring 28 mounted on the flared end portion of the tube. Sleeve 40 is shown having legs 34 extending through the openings therein and further having contact face 46 of contact portion 49 of the sleeve abutting abutment face 51 of the socket. This engagement of the abutment face of the socket with the contact face of the sleeve acts to prevent the sleeve from being displaced to the right as shown in FIG. 5. Additionally sleeve retaining ring 20 is shown mounted between sleeve contact portion 49 and expanded ring portion 12.

Figure 6:
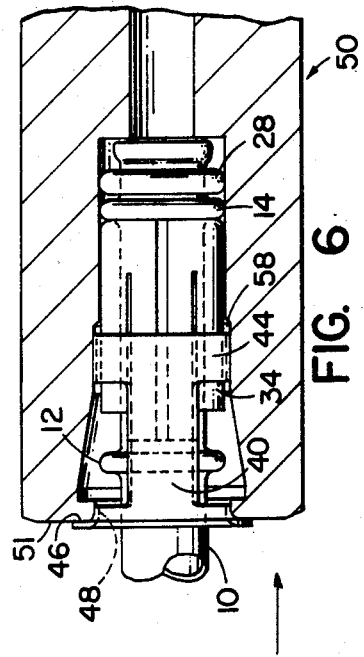
FIG. 6 is a view partially in section of the retainer being forced into the sleeve to compress the legs to facilitate removal of the plug assembly from the socket.

FIG. 6 shows the coupling assembly in a position where retaining ring 20 has been removed and tube 10 displaced to the right to effect compaction of retainer legs 34 to allow for removal of plug assembly 60 from socket 50. As shown in FIG. 6 tube 10 has been displaced to the right such that retainer 30 has been displaced to the right with the tube. As the retainer is displaced to the right the extending legs 34 are compressed as they are forced through compaction annulus 44 of sleeve 40. Sleeve 40, of course, is not displaced since contact face 46 engages abutment face 51 of the socket to prevent relative displacement. Additionally it can be seen that expanded ring portion 12 passes through the opening defined by inner surface 48 to allow the displacement to the right as shown. O-ring 28 and expanded ring portion 14 merely traverse to the right within the cavity seal portion of the center cavity.

Figure 7:
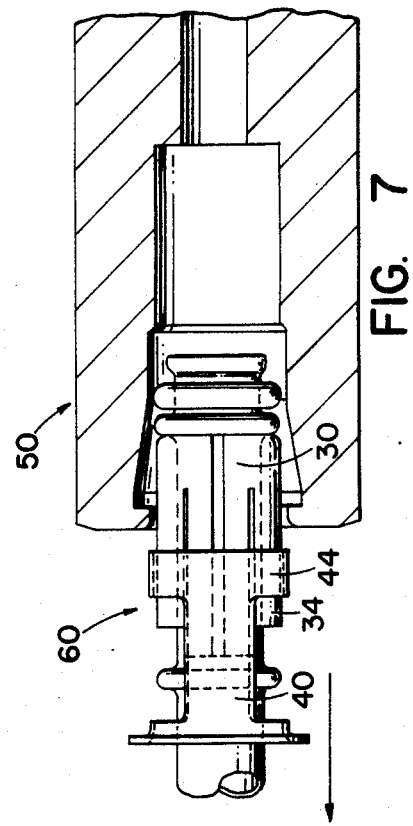
FIG. 7 is a view partially in section of the plug assembly partially removed from the socket.

FIG. 7 is a view similar to FIG. 6 showing the plug assembly 60 partially removed from socket 50. In this view it may be seen that the compaction annulus continues to hold the legs 34 in a compressed position such that as the entire plug assembly 60 is moved to the left the legs do not engage the socket contact face nor the leg receiving annulus of the socket. In this manner the coupling may be disconnected.

Figure 9:
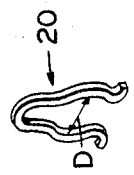
FIG. 9 is a perspective view of a sleeve retaining ring.

FIG. 9 is a perspective view of sleeve retaining ring 20. This ring is designed for easy application and removal from its designed location. Additionally as defined the ring has a lesser internal diameter D than the exterior diameter of expanded ring portion 12 such that it prevents the coupling from being inadvertently disconnected by preventing displacement to the right of the plug assembly.

OPERATION

In order to assemble the desired coupling the expanded tube end has a retainer mounted thereto and the sleeve retaining ring placed in position between an expanded ring portion and the retainer. The sleeve is then slid over the retainer such that the legs of the retainer extend through the openings in the sleeve body. The O-ring is then mounted on the flared portion of the tube end. The plug assembly formed from the tube retainer, sleeve, O-ring and the sleeve retaining ring is then manually inserted into cavity inlet 55 of the socket center cavity and displaced until such time as the sleeve contact portion engages the abutment face at the end of the socket and legs 34 expand outwardly into the leg receiving annulus 59 and act to engage the socket contact face to prevent removal of the plug assembly from the socket in the right-to-left direction.

To effect disconnecting of the coupling sleeve retaining ring 20 is first removed and the tube is then displaced to the right as shown in FIG. 6. As the tube is displaced the retainer secured between the expanded ring portions is also displaced, but however, the sleeve portion is secured in position. As a result of the relative sliding motion as the retainer slides within the sleeve, the legs of the retainer are compressed therewithin. Once fully displaced to the right the entire plug assembly may be removed by displacing the assembly to the left with the compaction annulus of the sleeve holding the legs in the compressed position such they may be readily removed through the cavity inlet of the socket. In this manner the coupling is easily and quickly disconnected.

The invention has been described with reference to a particular embodiment. It is to be understood by those skilled in the art that variations and modifications can be effected within the spirit and scope of the invention.

I claim:

1. A plug and socket coupling for use with fluid carrying members which comprises:
    a socket defining a central cavity including a fluid flow outlet and a portion for receiving the plug, said portion including a radially extending contact face;
    a plug assembly including a tube, a retainer with radially outwardly projecting flexible legs mounted about the tube and a sleeve mounted about the retainer sized to be able to slide over and compress the retainer legs, and means limiting axial movement of said retainer relative to said tube said plug assembly being sized to fit within the socket central cavity such that the projecting retainer legs engage the contact face to prevent removal of the plug assembly from the socket and such that the retainer may be displaced relative to the sleeve to cause the sleeve to compress the retainer legs radially inwardly to allow removal of the plug assembly from the socket; and
    sealing means extending between the socket and the plug assembly to effect a seal therebetween.

2. The apparatus as set forth in claim 1 wherein the sleeve further comprises:
    a compression annulus having an internal diameter slightly larger than the external diameter of the retainer body;
    a body portion connected to the annulus and defining openings therein through which the projecting retainer legs may extend to engage the socket contact face; and
    a contact portion sized to engage an abutment face of the socket to limit movement of the sleeve relative to the socket.

3. The apparatus as set forth in claim 2 wherein said means comprises first and second expanded ring portions projecting radially outwardly from the tube surface and wherein the retainer is mounted about the tube and secured from axial movement by the ring portion.

4. The apparatus as set forth in claim 3 and further comprising a sleeve retaining ring secured to the tube of the plug assembly between an expanded ring portion and the contact portion of the sleeve, said retaining ring being sized to engage the contact portion of the sleeve which engages the abutment face of the socket and being sized to engage the expanded ring portion of the tube thereby acting to prevent displacement of the tube and retainer into the socket to prevent the coupling from being disconnected.

5. The apparatus as set forth in claim 3 wherein the tube further comprises a flared end portion and sealing means mounted on the flared end portion which engages the socket center cavity walls to effect a seal therebetween.

6. The apparatus as set forth in claim 3 wherein the retainer comprises two generally semi-cylindrical members joined by a bending portion such that the retainer may be positioned on the tube between the expanded ring portions by spreading the two members and placing the retainer over the tube.

7. A quick connect/quick disconnect coupling which comprises:
    a tube having spaced radially outwardly extending expanded ring portions;
    a retainer having at least one flexible radially outwardly projecting leg and being sized to fit about the tube between the ring portions, said retainer including a retainer body having an exterior diameter and said leg being capable of being compressed to fit within said body diameter;
    a sleeve sized to be mounted over the retainer having a compaction annulus with an internal diameter slightly larger than the external diameter of the retainer, a body portion connected to the annulus which defines an opening through which the retainer leg may extend and a contact portion connected to the body portion at the opposite end from the annulus;
    said sleeve being mounted in the coupled position with the retainer leg extending through the opening and having a compact position wherein the compaction annulus engages the retainer leg to displace the leg radially inwardly to fit within a cylinder having the diameter of the retainer body; and
    a socket including an abutment face and defining a center cavity including an outlet and a leg receiving annulus including a contact face, such that the tube, retainer, and sleeve combination may be inserted into the center cavity until the contact portion of the sleeve engages the abutment face with the retainer leg extending radially outwardly to engage the leg receiving annulus and an end of the leg engaging the contact face to prevent the tube from being removed from the socket and wherein the tube may be removed from the socket by forcing the tube further into the socket such that the retainer is displaced by the tube but the sleeve is secured against the abutment face creating relative sliding motion such that the compaction annulus of the sleeve compresses the leg of the retainer radially inwardly and the entire tube, retainer, and sleeve assembly may then be removed from the socket.

* * * * *